(12) United States Patent
Abdel-Wahab et al.

(10) Patent No.: US 11,138,803 B1
(45) Date of Patent: Oct. 5, 2021

(54) SYSTEM FOR MULTI-PRESENCE INTERACTION WITH EXTENDED REALITY OBJECTS

(71) Applicant: AT&T Intellectual Property I, L.P., Atlanta, GA (US)

(72) Inventors: Mohammed Abdel-Wahab, Madison, NJ (US); Lee Begeja, Gillette, NJ (US); Eric Zavesky, Austin, TX (US); Tan Xu, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/863,690

(22) Filed: Apr. 30, 2020

(51) Int. Cl.
*G06T 19/00* (2011.01)
*G06N 20/00* (2019.01)
*G06F 3/0481* (2013.01)

(52) U.S. Cl.
CPC ........ *G06T 19/006* (2013.01); *G06F 3/04815* (2013.01); *G06N 20/00* (2019.01)

(58) Field of Classification Search
CPC .... G06T 19/006; G06N 20/00; G06F 3/04815
USPC ....................................................... 345/633
See application file for complete search history.

(56) References Cited

U.S. PATENT DOCUMENTS

| 6,408,257 B1 | 6/2002 | Harrington et al. |
| 8,046,719 B2 | 10/2011 | Skourup et al. |
| 8,485,038 B2 | 7/2013 | Sengupta et al. |
| 10,429,923 B1 * | 10/2019 | Johnston ............ G02B 27/0176 |
| 2014/0368537 A1 * | 12/2014 | Salter ...................... G06F 3/011 |
| | | 345/633 |
| 2016/0018886 A1 * | 1/2016 | Song ...................... A63F 13/213 |
| | | 715/757 |

(Continued)

OTHER PUBLICATIONS

Saquib, Nazmus et al., "Interactive Body-Driven Graphics for Augmented Video Performance", Nazmus Saquib, Rubaiat Habib Kazi, Li-Yi Wei, Wilmot Li. CHI Conference on Human Factors in Computing Systems Proceedings (CHI 2019, May 2019, Glasgow, United Kingdom. 10.1145/3290605. hal-02005318, May 1, 2019, 13 pgs.

*Primary Examiner* — Thomas J Lett
(74) *Attorney, Agent, or Firm* — Guntin & Gust, PLC; John G. Rauch

(57) ABSTRACT

Aspects of the subject disclosure may include, for example, scanning, by an augmented reality system, a local environment which includes an object. The scanning includes identifying one or more characteristics of the object such as its size or shape. The subject disclosure may further include providing, to a display device of a local user in the local environment, local image information of the object from a viewing perspective of the local user and providing, to a display device of a remote user in a remote environment, remote image information of the object from a viewing perspective of the remote user. The subject disclosure may further include detecting a local user interaction with the object, detecting a release of control of the object by the local user to control of the object by the remote user, and providing updated local image information of the object to the display device of the local user and providing updated remote image information to the display device of the remote user based on the release of control of the object. Other embodiments are disclosed.

20 Claims, 8 Drawing Sheets

(56) References Cited

U.S. PATENT DOCUMENTS

2016/0350973 A1\* 12/2016 Shapira .................. G06F 3/017
2019/0362562 A1\* 11/2019 Benson .............. G06K 9/00671

\* cited by examiner

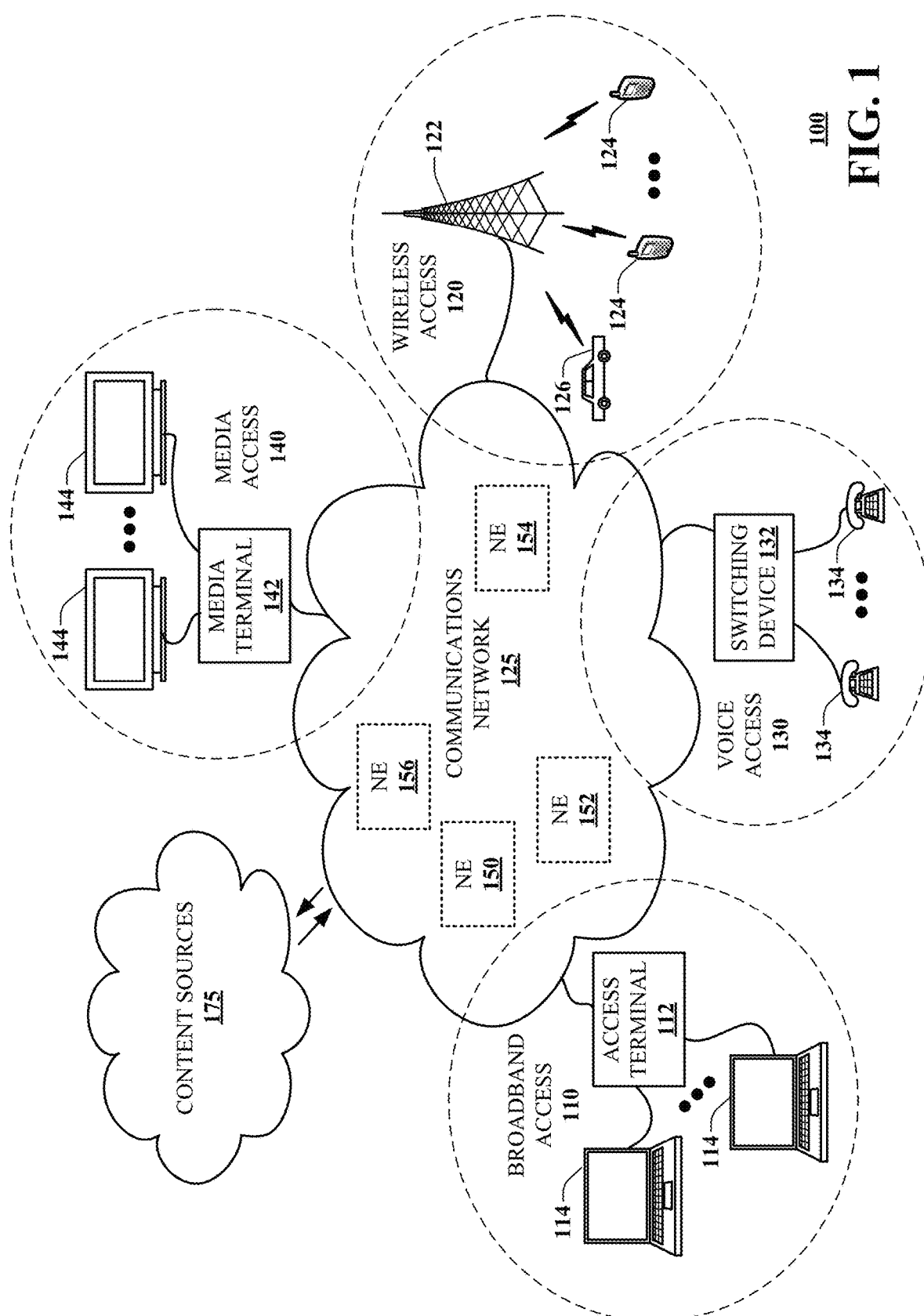

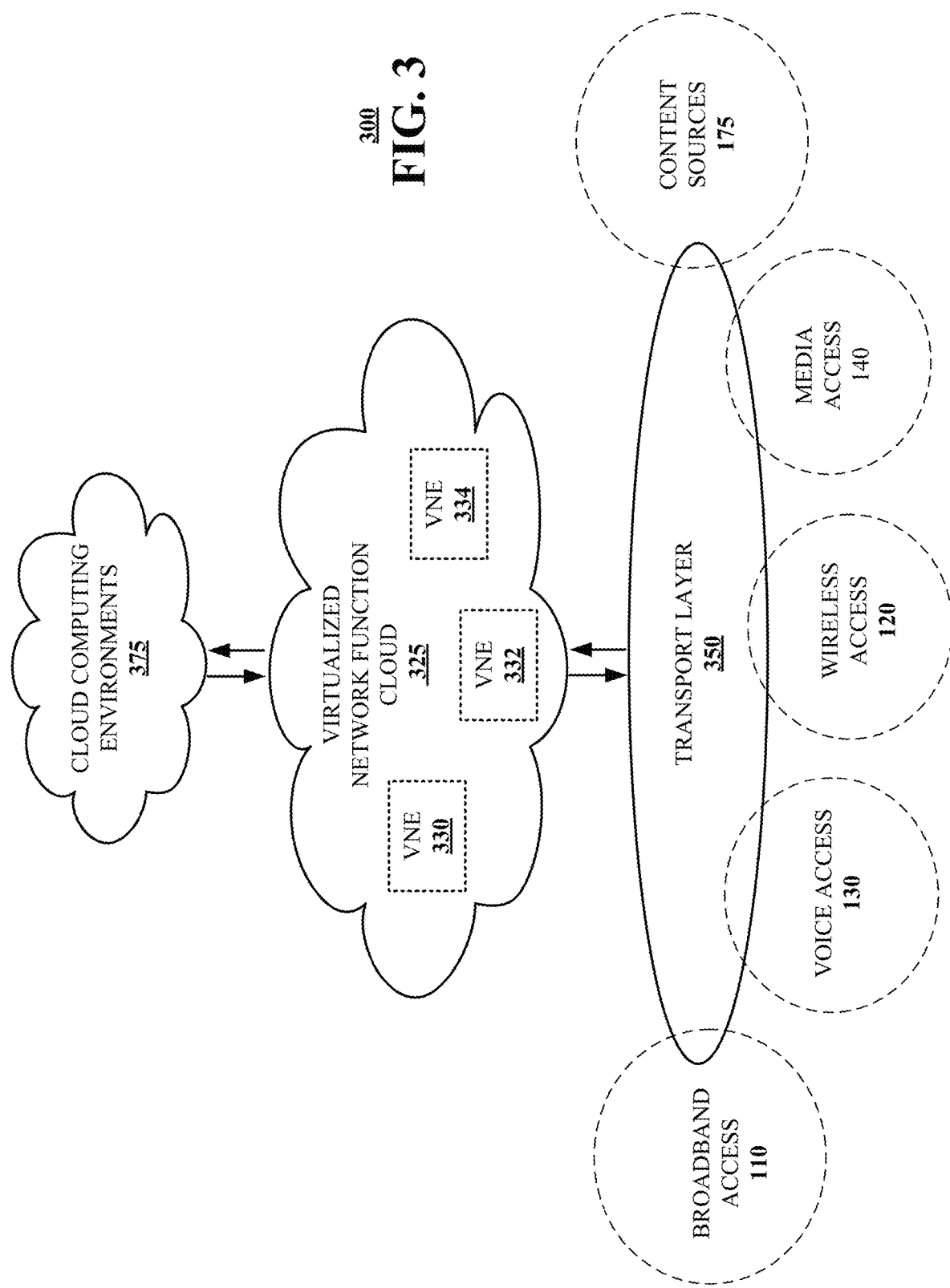

SYSTEM FOR MULTI-PRESENCE INTERACTION WITH EXTENDED REALITY OBJECTS

FIELD OF THE DISCLOSURE

The subject disclosure relates to system for multi-presence interaction with extended reality objects.

BACKGROUND

Extended reality and remote collaboration systems enable more than one individual to physically work together on a physical item or object, even while located remotely from each other. The individuals can each physically interact with the item or object.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

FIG. 3 is a block diagram illustrating an example, non-limiting embodiment of a virtualized communication network in accordance with various aspects described herein.

DETAILED DESCRIPTION

Figure 2A:
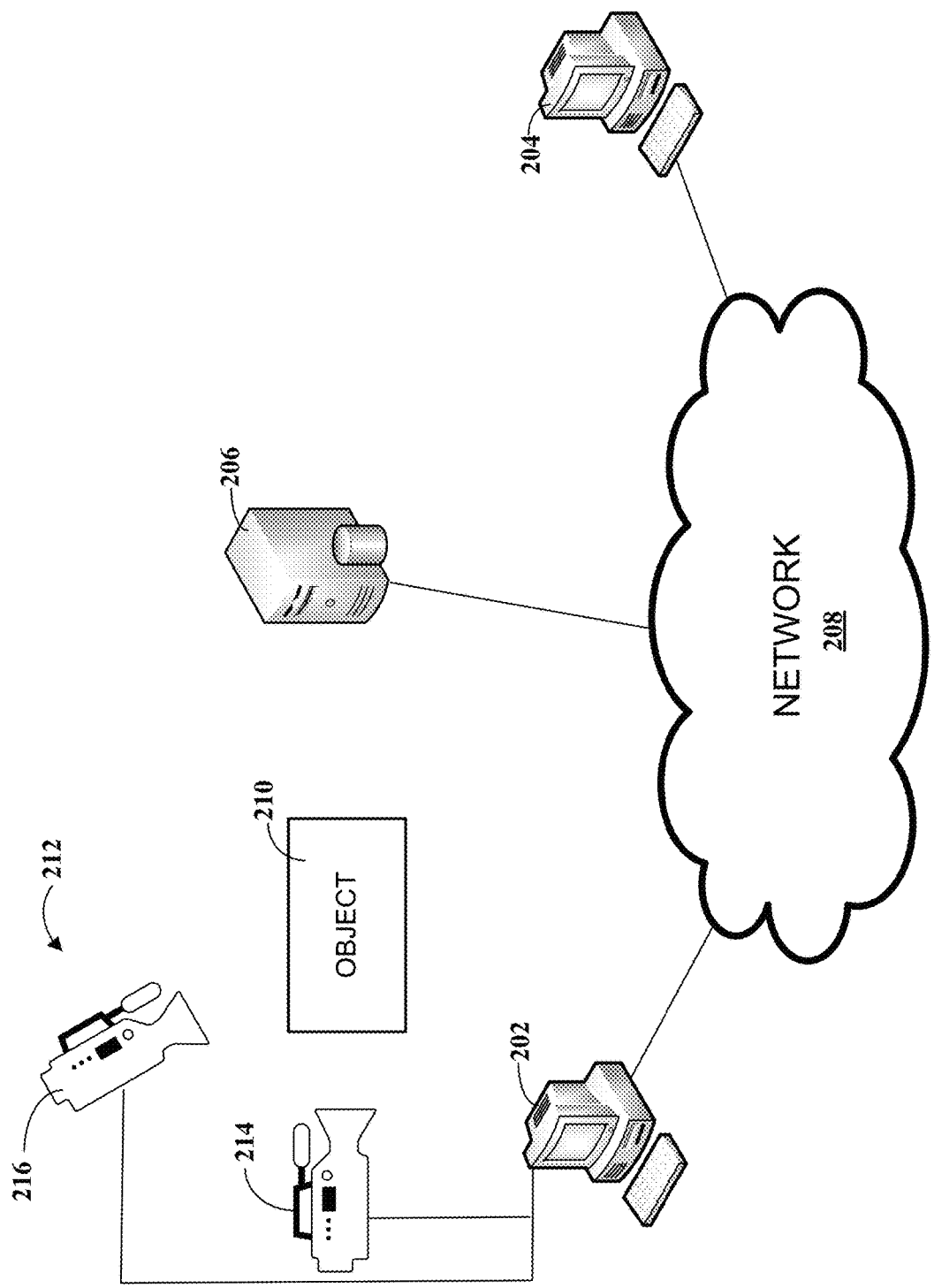
FIG. 2A is a block diagram illustrating an example, non-limiting embodiment of a system functioning within the communication network of FIG. 1 in accordance with various aspects described herein.

As extended reality (XR) and remote collaboration systems grow in popularity, the sharing of objects between multiple users will similarly grow in complexity. An object may be physically located locally in the presence of one user. That user may interact with the object physically, for example by manipulating or modifying it, moving it and changing its orientation or makeup. One or more remotely-located users may experience and interact with the object virtually, for example using data processing systems communicating over a network. The physical interaction with the object, such as an object local to one user alone, needs special treatment to quickly enter into a two-way or multiple-party collaboration session. Conventional methods focus on costly or pre-calibrated stages to enter the object as a simplified model into the experience. For example, some gaming systems color code objects that may be manipulated so that a green object may be picked up and carried by a game player, and the gaming system will know the location of the object in space, and so forth. Additionally, conventional systems do not accommodate the physics of an object such as a ball or a stick that may be thrown or propelled, such as in a game or demonstration. The physics of an object relate to dynamic actions and reactions of the object such as a trajectory through a space, acceleration or deceleration such as due to gravity on the object, rotation, collisions with other objects and associated rebounds, deformation due to the collision or other physical engagement by the object, and so forth. An improved system in accordance with features described herein employs augmented reality (AR) and computer vision (CV) systems to automatically identify objects and the trajectories of objects and translate both the objects and their trajectories to the shared, virtual experience.

Apparatus and method in accordance with the subject disclosure provide many advantages over conventional systems. These advantages may include an ability to virtualize an arbitrary object and allow two-way manipulation and exploration of the object with one local user. The object may be represented with a temporary synthesized placeholder while an augmented reality and computer vision system scans additional details for structure and texture. Further, the apparatus and method in accordance with the subject disclosure enable a virtualized object to maintain proper physics for real-time manipulations. For example, the physics of the object, when the object was thrown, rotated, etc., remain fixed but the structure and the texture of the object can be modified during or after the primary experience. Some conventional systems have been able to model an object's weight due to gravity, but computation mechanisms for an arbitrary object have not been well thought-out.

Other advantages provided may relate to visual and appearance aspects of the system and method. The apparatus and method in accordance with the subject disclosure further provide the ability to in-paint an image to remove local objects that have been virtualized. That is, once an object is virtualized, the augmented reality system uses the computer vision system to effectively erase the existing object for the local user and focus instead on the virtualized instance that is being collaboratively manipulated. Similarly, if two users are collaborating on an item and one user moves the item, the view for the other user changes in near-real time. Still further, the apparatus and method in accordance with the subject disclosure enable taking a snapshot and replaying activity of an object. That is, once an object is virtualized, the trajectory, manipulations, etc., are tracked by the system as they are conveyed to remote users.

The disclosed apparatus and method serve to bridge the use of physical objects from the physical space of one person to the virtual space of another person. An object located in the physical space of a person is adjacent to the person and can be viewed, touched, manipulated and otherwise sensed directly by the person. An object located in the virtual space of a person is not immediately adjacent to the person, not able to be directly touched, manipulated or sensed. However, by means of technology such as computer vision, augmented reality or extended reality as implemented by one or more data processing systems, cameras, displays and other devices, the user may interact with and manipulate the object located in the user's virtual space. Compared to conventional systems, the objects in a system in accordance with the subject disclosure are not static such as a pencil or eraser which may be identified by computer vision or radio frequency identification (RFID) tags.

The disclosed apparatus and method provide very good correspondence between the object and the persons who interact with the object. For example, in the case of tossing a ball or other object between a first user and a second user, there must be good correspondence between the ball's velocity, angle and other physical properties of the ball. There must be correspondence between how the first person sees the ball and how the second person sees the ball. In one conventional system, a system will put a lock on an object to lock the object to a single person at a time. Thus, a first person can hold and manipulate the object but, because of the lock, while the first person holds the object, no one else can hold or manipulate the object. In fact, changes made to the object by the first person cannot be seen by others while lock is in place. Once the first person releases the object and it becomes unlocked, then the server or other computer system propagates changes in the object to other persons. There is a mutually exclusive control of the object in such a conventional system.

The subject disclosure describes, among other things, illustrative embodiments for an apparatus and method for multi-user interaction with extended reality object in an augmented reality system. Other embodiments are described in the subject disclosure.

One or more aspects of the subject disclosure include a device, including a processing system including a processor and a memory that stores executable instructions that, when executed by the processing system, facilitate performance of operations. The operations may include scanning a local environment including an object, including identifying one or more characteristics of the object, and providing, to a display device of a local user in the local environment, local image information of the object viewed from a viewing perspective of the local user. The operations may further include providing, to a display device of a remote user in a remote environment, remote image information of the object viewed from a viewing perspective of the remote user. The operations may further include detecting a local user interaction with the object by the local user, detecting a release of control of the object by the local user to control of the object by the remote user, and providing updated local image information of the object to the display device of the local user and providing updated remote image information to the display device of the remote user based on the release of control of the object.

One or more aspects of the subject disclosure include detecting, by a processing system including a processor, an object in an augmented reality system, the object located in a local environment of a local user of the augmented reality system. The subject disclosure may further include displaying, by the processing system, the object in the local environment in a local display on a local display device of the local user, including displaying the object from perspective of the local user. The subject disclosure may further include providing, by the processing system, a remote display of the object on a remote display device of a remote user of the augmented reality system, including displaying a remote virtual image of the object in the local environment from perspective of the remote user. The subject disclosure may further include detecting, by the processing system, an interaction by the local user with the object, identifying, by the processing system, one or more characteristics of the object, wherein the identifying is responsive to the detecting the interaction by the local user with the object, and detecting, by the processing system, a movement of the object by the local user from a first location in the local environment to a second location in the local environment. The subject disclosure may further include updating, by the processing system, the local display of the object on the local display device, including in-painting a portion of the local display at the first location and providing a local virtual image of the object at the second location, and updating, by the processing system, the remote display of the object on the remote display device, wherein updating the remote display comprises providing the remote virtual image of the object in the second location of the local environment.

One or more aspects of the subject disclosure include a method including detecting, by a processing system including a processor, an object in an augmented reality system, the object located in a local environment of a local user of the augmented reality system, and displaying, by the processing system, the object in the local environment in a local display on a local display device of the local user, including displaying the object from perspective of the local user. The method may further include The method may further include providing, by the processing system, a remote display of the object on a remote display device of a remote user of the augmented reality system, including displaying a remote virtual image of the object in the local environment from perspective of the remote user, and detecting, by the processing system, an interaction by the local user with the object. The method may further include identifying, by the processing system, one or more characteristics of the object, wherein the identifying is responsive to the detecting the interaction by the local user with the object and detecting, by the processing system, a movement of the object by the local user from a first location in the local environment to a second location in the local environment. The method may further include updating, by the processing system, the local display of the object on the local display device, wherein the updating the local display comprises in-painting a portion of the local display at the first location and providing a local virtual image of the object at the second location. The method may further include updating, by the processing system, the remote display of the object on the remote display device, wherein updating the remote display comprises providing the remote virtual image of the object in the second location of the local environment.

Referring now to FIG. 1, a block diagram is shown illustrating an example, non-limiting embodiment of a communications network 100 in accordance with various aspects described herein. For example, communications network 100 can facilitate in whole or in part an augmented reality system operated with a local user at a local site including an object at a local environment and a remote user at a remote site. Each of the local user and the remote user operate user devices that facilitate participation in the augmented reality system over the communication network 100. The augmented reality systems permits both users to interact with the object and by virtualizing the object for two-way manipulation without using a prior three-dimensional model of the object. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system 200 for multi-presence interaction with extended reality functioning within the communication network of FIG. 1 in accordance with various aspects described herein. The system 200 includes a local user device 202, a remote user device 204, and an augmented reality (AR) device 206. The local user device 202, the remote user device 204, and the AR device 206 communicate over one or more networks such as network 208. The network 208 provides data communication among devices coupled to the network and may include the internet as well as local private networks, local area networks and other types of networks, both wireless and wireline networks. The system 200 may include, in other embodiments, more devices or alternative devices. The exemplary embodiment of FIG. 2A is presented to simplify the discussion herein.

The local user device 202 in a typical embodiment includes a data processing system including one or more processors and memory. In the example of FIG. 2A, the local user device 202 is illustrated as a desktop computer but it should be noted that any suitable device providing data processing and network communication capability may be used to implement the local user device 202. In other embodiments, the local user device 202 may include in addition or instead a laptop computer, a tablet computer or other mobile device, a gaming console, a virtual reality (VR) headset, or any other suitable device or combination of devices to provide the functionality described herein. Generally, a suitable device may include including data processing and network communication capability. The local user device 202 generally includes a display device for displaying images for viewing by a human user. The local user device 202 operates to communicate over the network 208 with devices including the remote user device 204 and the AR device 206.

The remote user device 204 includes a data processing system including one or more processors and memory. Further, the remote user device 204 includes network communication capability to communicate over the network 208. In the exemplary embodiment of FIG. 2A, the remote user device 204 is illustrated as a desktop computer but any suitable device providing data processing and network communication capability may be used to implement the local user device 202. In other embodiments, the local user device 202 may include in addition or instead a laptop computer, a tablet computer or other mobile device, a gaming console, a virtual reality (VR) headset, or any other suitable device or combination of devices to provide the functionality described herein. The remote user device 204 generally includes a display device for displaying images for viewing by a human user. The remote user device 204 operates to communicate over the network 208 with other devices including the local user device 202 and the AR device 206.

The AR device 206 communicates with other devices over the network 208 including the local user device 202 and the remote user device 204. The AR device 206 may be implemented as one or more server computers including a processing system with one or more processors and memory. The memory may include a database of data and instructions for controlling operation of the AR device 206 as well as for interacting with the local user device 202 and the remote user device 204 to implement function of multi-presence interactions with extended reality objects in accordance with some embodiments described herein.

The AR device 206 permits users of the local user device 202 and the remote user device 204 to collaboratively interact with an object 210 using computer vision, augmented reality, extended reality and other data processing functions. The object 210 is located physically near, with or at the local device, or a user of the local device. That is, the user of the local user device 202 may directly see the object and, in some instances may touch and manipulate and modify the object 210. The object 210 may be located directly adjacent to the user of the local user device 202 or the object may be spaced away from the user, such as in a sealed chamber accessible with a mechanical device controlled by the user of the local device.

The object 210 may be any physical object of interest. In one example, the object may be a ball or other game piece of a game, where the system 200 or the AR device 206 are part of a gaming system. In another example, the object 210 includes a workpiece, where the user of the local user device 202 and the remote user device 204 collaborate on design, develop, manufacture or some other aspect of development of the workpiece. In yet another example, the object 210 may include an item in commerce which is being show, demonstrated or modelled by a user at the local device to a user at the remote device. The system 200 may enable the broadest range of interactive collaboration by local and remote users, including viewing, manipulating, sharing and modifying the object 210.

Associated with the local user device 202 and the object 210 is imaging system 212. The imaging system 212 operates to develop an image of the object 210. The image may be encoded data, such as a JPEG encoded file or a file encoded according to any other standard. In some embodiments, the image may be a live-action video image and may be encoded according to any suitable format, such as according to an MPEG format. In the illustrated example of FIG. 2A, the imaging system 212 includes one or more cameras including camera 214 and camera 216. In other embodiments, other numbers and configurations of cameras may be employed to form the image or images of the object 210.

The imaging system 212 provides image data and other information to the AR device 206, either directly or through the local user device 202. Thus, the imaging system 212 may be in data communication with the local user device 202, the remote user device 204 or the AR device 206. The data communication may be by means of one or more networks such as the network 208, including the internet and one or more local networks. The AR device 206 operates on the image data received from the imaging system 212 to control the images provided to the local user device 202 and the remote user device 204. The AR device 206 and the imaging system 212, alone or in combination, may implement a computer vision (CV) system. A computer vision system in some embodiments operates to acquire, process, analyze and understand digital images captured, for example, by camera 214 and camera 216.

In some embodiments, the imaging system 212 may form part of or may comprise a virtual reality (VR) system such as a VR headset. A VR headset may be a head-mounted device to provide visual display to a person wearing the headset and. It may include stereoscopic, head-mounted display providing separate images for each eye, or a single image for both eyes. The VR headset may also include head motion tracking sensor or eye-tracking sensors. The VR headset may include, for the imaging system 212, one or more cameras to develop an image of objects such as the object 210 before the wearer of the VR headset. The wearer of the VR headset may be the user of the local user device 202 or may be another individual. The wearer of the VR headset may be located in the same physical space as the object 210 and may touch and manipulate and otherwise engage with the object 210. In this manner, the wearer of the VR headset at the local user device 202 may collaborate with another user at the remote user device 204 to interact with the object 210.

The system 200 in accordance with the subject disclosure operates to virtualize an arbitrary object for interaction at both the local user device 202 and the remote user device 204. The system 200, under control of the AR device 206, allows two-way manipulation and exploration of an object such as the object 210 by a local user associated with the local user device 202. The object 210 may be represented with a temporary synthesized place holder as the AR device 206 and computer vision system scan additional details for structure and texture of the object 210.

In the system 200 in accordance with the subject disclosure, the virtualized object maintains physics for real-time manipulations. The physics of an object describes the object's relation to the real world, including whether the object was thrown, rotated, deformed, etc. In the system 200, the physics of the object 210 remain fixed but the structure and texture and other physical features of the object 210 may be modified during or after a primary experience by the user at the local user device 202.

The system 200 in accordance with the subject disclosure features the ability to in-paint images of the object and its environment at the local user device 202 and the remote user device 204. The in-painting can be done at the local device, under control of the AR device 206, to remove a local object that has been virtualized. Once the object has been virtualized, the AR device 206 can use computer vision to erase from view the existing object from the display of the local user device 202 presented to the user. The AR device 206 can then focus on the virtualized instance that is being collaboratively manipulated with the use of the remote user device 204.

The system 200 in accordance with the subject disclosure features the ability to take a snapshot or record a video and provide subsequent replay of an object. For example, once an object is virtualized by the AR device 206, its trajectory, manipulations, etc., are tracked by the AR device 206 as they are conveyed to the remote user device 204.

The system 200 in accordance with the subject disclosure provides substantial advantages relative to conventional systems. For example, the system 200 bridges physical and virtual objects for two-way manipulation by multiple users, without the need for a user to have to specify, calibrate or explicitly scan objects of interest. The system has the ability to virtualize a local object and allows for two-way manipulation of an object without prior three-dimensional modelling of the object or intense tracking of the object with interactive reality (IR). The system provides for in-painting to effectively erase a real object from the view of a local user when it is added to a virtual space such that the local user only sees the intractable virtual object. The system is able to manage existing physics controls when virtualizing an arbitrary object in an augmented reality (AR) scenario for a multi-user environment. For example, an object thrown in a local environment becomes a virtualized object. The system may provide multiple feedback options to deliver low-latency virtualization of and interaction with multiple objects between multiple users. The system further provides a new ability to create how-to videos and object-centric replay of interactions without explicit tracking specification by a user. For example, a local user picks up an object, the object is virtualized and the virtual object is tracked with the session for transmission to another user. The object may be any arbitrary object, represented with relatively high fidelity as to appearance including shape, texture, and color, when viewed by any and all users. Unlike conventional systems, the object need not be captured as a video feed or processed as a low-fidelity version.

Figure 2B:
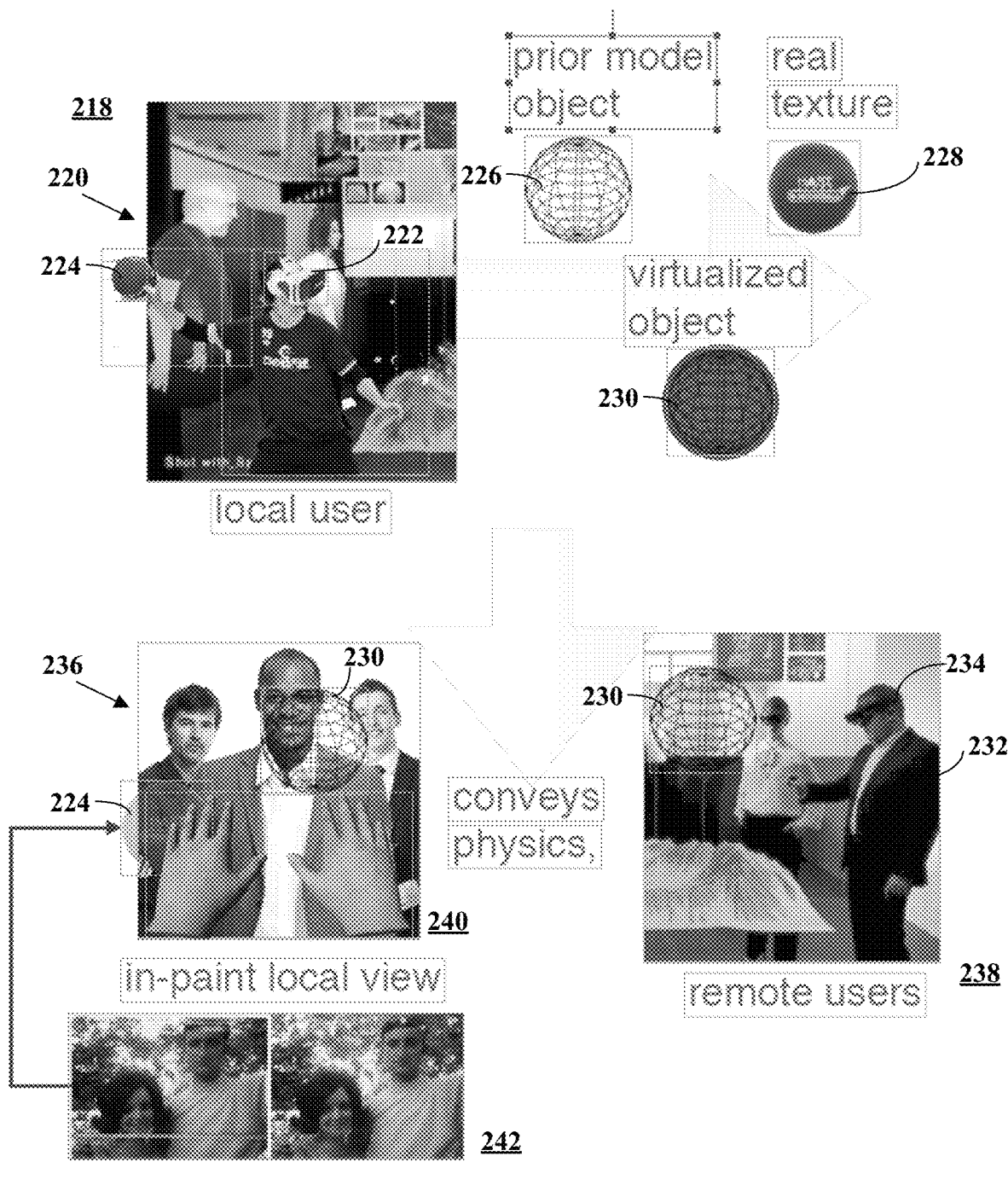
FIG. 2B is a block diagram illustrating a plurality of exemplary use cases for an example, non-limiting embodiment of the system of FIG. 2A in accordance with various aspects described herein.

FIG. 2B is a block diagram illustrating a plurality of exemplary use cases for an example, non-limiting embodiment of a system such as the system 200 in accordance with various aspects described herein. The use cases illustrated in FIG. 2B are intended to be illustrative of possible uses for the disclosed system and method and to illustrate features and advantages thereof.

A first use case 218 involves game play. A user at a local user device 202 wearing a VR headset 222 grasps and throws an object 210, in the example a physical ball 224. The VR headset 222 includes one or more cameras as part of an imaging system that capture images of the physical ball 224. The VR headset 222 further includes displays for providing images to the eyes of the local user at the local user device 202. The images of the physical ball 224 are provided to an augmented reality system such as AR device 206 (FIG. 2A). The augmented reality system retrieves from storage a prior object model 226 matching characteristics of the physical ball 224 detected by the imaging system. Such characteristics include shape, size and the physics of the physical ball 224. The prior object model 226 may be modified to better match the physical ball 224 visually. For example, other characteristics such as the actual texture 228 of the physical ball 224 determined by the imaging system and augmented reality system, are combined with the prior object model 226 to define a virtualized object, virtual ball 230.

After virtualization, the virtual ball 230 becomes visible to remote users. A first remote user 232, wearing a second VR headset 234 sees the image of the virtualized object, virtual ball 230. The image of the virtualized object 230 is conveyed with physics of the ball 224. That is, if the ball has a velocity or a rotation, or collides with another object, or is deformed, those features are maintained by the augmented reality system which provides to the second VR headset 234 the images of the virtualized object. Other remote users 236 may see the virtual ball 230 as well, in a different context, but with the physics of the virtualized object maintained and with other characteristics of the physical ball 224, such as its real texture 228, intact.

In a second use case 238, a remote user 232 viewing the virtual ball 230 through the VR headset 234, may collaboratively manipulate the object 210 or physical ball 224, as virtualized to the virtual ball 230. The second use case 238 may include a computer aided design (CAD) arrangement where the local user at the local user device 202 and the remote user 232 collaborate on the process. Thus, the local user at the local user device 202 can start with one or more realistic objects and apply manipulations to the object while the manipulations are streamed to the remote user 232.

A third use case 240 involves presentation of an instructional video. Third use case 240 shows the physical ball 224 from the perspective of a local user who is physically located with the physical ball 224. However the image of the physical ball 224 seen by the local user has been in-painted to reflect that the virtualized object, virtual ball 230, has been moved in the virtual environment. The virtual ball 230 is presented in the image in its location in the virtual environment. The physical ball 224 is in-painted in the image by covering the image of the physical ball 224, blurring the image of the physical ball 224, etc. In an example of this use case, a real object such as the physical ball 224 becomes virtualized as described above. Subsequently, the augmented reality system can track the virtualized object, virtual ball 230, including its interactions with other objects and manipulations by other users, and store data defining this history. The stored data can later be retrieved and presented to users 236 for another augmented reality or two-dimensional video experience.

A fourth use case 242 involves virtualizing a shopping experience. In this example, a local user picks up physical merchandise, manipulates it and then communicates with a manufacture of the merchandise. The communication from the local user may specify modifications that the manufacturer can make to produce the merchandise for the local user, such as a new texture, three-dimensional printing, etc. Using snapshotting and replay, the local user in another example converts an existing three-dimensional object to a virtualized object and then manipulate the virtualized object. The user communicates the virtualized object to the manufacturer for modification and manufacture. In another example, a joint session takes place, involving collaboration and manipulation of the virtualized object by a designer located either with the local user or the remote manufacturer. The fourth use case 242 further illustrates the process of inpainting in that the image on the right is virtualized to remove or modify certain features of the physical image on the left, such as text, blemishes and errors.

The functions and features described herein may be readily extended to the widest variety of use cases.

Figure 2C:
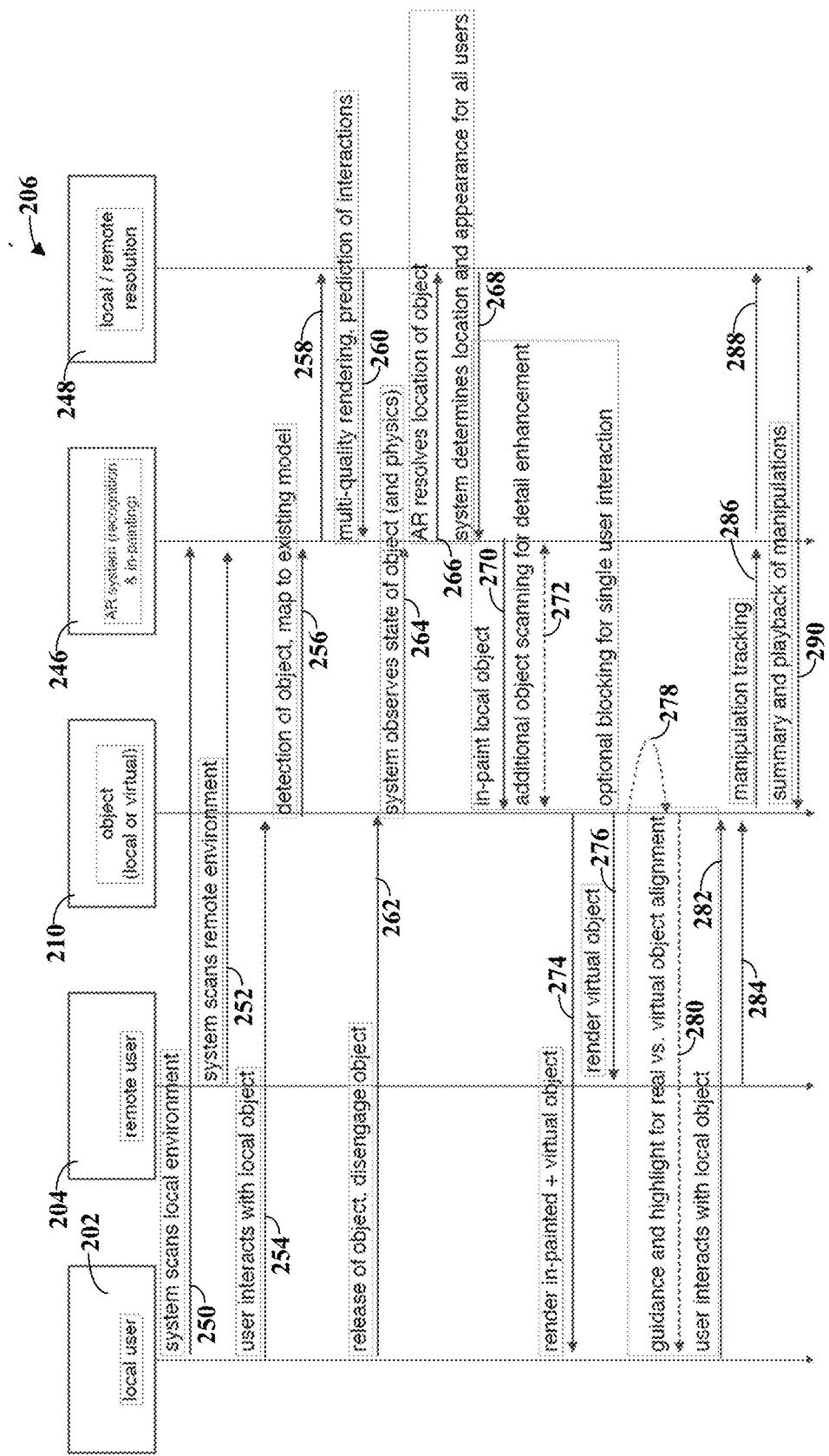
FIG. 2C depicts an illustrative embodiment of a process for collaborative interaction using extended reality in accordance with various aspects herein.

FIG. 2C depicts an illustrative embodiment of a process 244 for collaborative interaction using extended reality in accordance with various aspects herein. FIG. 2C illustrates process flow for the process 244 between a local user device 202 and a remote user device 204 interacting with an object 210 under control of an augmented reality (AR) device 206. The object 210 may include data defining the virtualization of the physical object the data represent. In the example embodiment of FIG. 2C, the AR device 206 includes an AR system 246 and a local/remote resolution system 248. The AR system 246 manages the recognition and the appearance of the object of the object 210 through the virtual reality or other systems of the local user device 202 and the remote user device 204. The local/remote resolution system 248 may operate to rationalize which user, the local user device 202 or the remote user device 204, has control and view of the object 210. The local/remote resolution system 248 determines how to show or display the object to all users while the object 210 is in motion or while it is being used. The local/remote resolution system 248 operates to predict interactions by users and to determine location and appearance of the object for all users.

Similar to the embodiment of FIG. 2A, the local user device 202, the remote user device 204 and the AR device 206 of FIG. 2C may communicate data and other information over a network. The local user device 202 includes a device such as a processing system with a processor and memory and imaging system. The remote user at the remote user device 204 includes a device such as a processing system with a processor and memory and an imaging system.

The process 244 begins with the AR system 246 understanding the environments where the local user device 202 and the remote user device 204 are located. At step 250, the local user device 202 scans the local environment of the local user device 202 and provides local user environment information to the AR system 246. This step may occur in response to an inquiry from the AR system 246, or this step may occur in response to initiation of interaction by the local user device 202 with the object 210, or due to any other suitable stimulus. In other embodiments, the AR system 246 may autonomously control the imaging system of the local user device 202 to view the object 210, the local user device 202 and the environment thereof. In one embodiment, the imaging system views the environment where the local user is situated and collects information about the environment. This may include developing a three-dimensional image of the environment including objects and people present in the environment. The information collection may be done by one or more cameras of the imaging system and may include still photos and video images taken from one or multiple angles or viewpoints. For example, a VR headset worn by the local user may include one or more cameras that can view and scan the environment. In other embodiments, collecting information may be done by one or more static cameras in the environment.

The scanning of the environment may be repeated subsequently in some embodiments. Scanning may be done one time, on an occasional updating basis or may be done continuously, depending on factors such as available bandwidth, relative dynamics of the situation or environment, and others. For example, if the environment is relatively unchanging over time, or if data communication bandwidth is relatively expensive or unavailable, the collection of information about the environment may be done less frequently. On the other hand, if the environment is changing rapidly and bandwidth for data communication is available, the collection of information may be done relatively more frequently. The updating of information about the room may be adjusted dynamically as well to reflect the level of activity in the environment. For example, if a periodic scan determines that a new object has been added to the environment, scanning rate or scanning detail level may be temporarily increased to develop a model of the new object. The AR system 246 may collect information about the size and shape of the new object, its texture, its weight or deformation, its rigidity or deformability, if any, and its physics including trajectory, velocity, rotation, etc.

In some examples, there may be many objects such as the object 210 in the environment. Scanning and analyzing all objects may be too computationally intensive at some times. To reduce computational overhead, an object may only be scanned and processed at the time the object comes into play in the environment. For example an object may be located by the AR system 246 but not analyzed until it moves in the environment or is touched or engaged by the local user of the local user device 202. At that time, the AR system 246 will scan the object, including determining its size, shape, physics, and so forth. Scanning may be computationally intensive and may require substantial time to complete. To reduce the delay, in some embodiments, the AR system 246 may employ a model which is a simplified version of the object until the AR system 246 completes scanning the object. The estimation may be adequate to determine basic nature of what the user is interacting with and what the user is doing with the object. The machine learning model may further estimate the pose of the user and how the user is holding the object. The retrieved model may be used in place while the AR system 246 scans more texture and shape information of the object 210 or receives such information from the local user device 202. This strategy accommodates both relatively low-power mobile augmented reality systems, such as on a battery-powered mobile device, and more complex three-dimensional time of flight (ToF) systems or structure from motion (SfM) systems. ToF and SfM are technologies for construction three-dimensional models.

The information collected in step 250 may include information about objects in the environment, such as a game piece, a workpiece or other items of interest. The collected information may further include information about the local user or the physical location of the object 210 or the local user device 202, such as a room and its contents. The local user environment information is provided over a network to the AR system 246. Any suitable data formatting or encryption may be used during communication to the AR system 246.

The processes of scanning the local environment, step 250, and scanning the remote environment, step 252, may take into account visual aspects such as lighting or illumination in the two environments. In some applications, lighting conditions in the local environment might be different from lighting conditions in the remote environment. In order to make the object 210 look real when rendering the object 210 in the remote environment, the AR system 246 may change the lighting of the object according to the remote environment. The user device of the remote user must display the object and displaying the object in the device must set up environmental conditions for the display. The environment may include a table on which the object rests and is displayed. Lighting conditions must accommodated and adjusted by the AR system 246 when the object is rendered on the device of the remote user.

Similarly, at step 252, the remote user device 204 scans the environment of the remote user device 204 and provides remote user environment information to the AR system 246. This step 252 may be initiated in response to an inquiry from the AR system 246 or in response to any other stimulus. In another embodiment, the AR system 246 may autonomously control the imaging system of the remote user device 204. The remote user information may include information about the remote user or the physical location of the remote user device 204 or other information that may be of use to the AR system 246. The remote user environment information is provided over a network to the AR system 246. The local user environment information and the remote user information provided at step 250 and step 252 to the AR system 246 enable the AR system 246 to develop an understanding of the local and remote environments.

At step 254, the AR system 246 detects an interaction by the local user of the local user device 202 with the object 210. For example, the AR system 246, viewing image information or other scanned information from the imaging system of the local user device, detects a hand or other body parts of the local user as well as the physical pose of the local user relative to the object 210. In one example, where the interaction is through a gaming system, the physical pose may correspond to being ready to throw a ball or other game piece. In another example, where the interaction is designing or manufacturing a workpiece by two persons, detecting the physical pose may include detecting that the user is positioned to engage a workpiece either by hand or with a tool or instrument. This step 254 may include any sort of interaction, including picking up the object, touching the object by a hand or an instrument or tool, and other possibilities as well. The AR system 246 in some embodiments continuously or periodically scans the environment of the local user device 202 and determines that the local user has interacted with the object 210.

At step 256, the AR system 246 detects the object 210 and maps the object to an existing model. The existing model may be one of a set of possible models stored in a database or other memory by the AR system 246. A machine learning or artificial intelligence model may be retrieved or developed for an object having characteristics similar to those of the object 210, such as the shape of the object. The model may be defined in any suitable manner. In particular embodiments, the AR system 246 may require time to scan and characterized the object 210, such as identifying the shape of the object 210, the size of the object, texture and other visual aspects of the object 210, and determining if the object is deformed or in motion. During this time, the AR system 246 may retrieve from storage a machine learning model based on initial information, such as size and shape of the object 210. In one example, if the AR system 246 determines the object is round and 10 cm in diameter, the AR system 246 may retrieve from a database a model with those initial parameters. As the scanning process continues and the AR system 246 learns more details about the object 210, the model may be modified and updated to reflect the additional known details.

After the user begins interacting with the object 210 in step 254 and the AR system 246 characterizes the object, the AR system continues tracking the user interaction with the object 210. At step 258, the AR system 246 cooperates with the local/remote resolution system 248 to resolve when the local user releases or transfers the object 210 to the remote user. The local/remote resolution system 248 determines how to display the object 210 to all users while the object 210 is in motion or while it is being used by one of the users. The local/remote resolution system 248 operates to predict interactions by users and to determine location and appearance of the object for all users. In some embodiments, the local/remote resolution system 248 begins operation in response to an action involving the object 210. Example actions may include a gesture by a user, an action to throw the object 210 toward a display screen, a speech command by one of the users, tracking a gaze of the user's eyes, or any other physical action to indicate transfer of the object 210 from one user to the other user. At step 258, the AR system 246 provides to the local/remote resolution system 248 information about the environment of the local user device 202, the environment of the remote user device 204 and the object 210.

Initially, the object 210 is viewed by the local user on a video display of the local user device 202. In some embodiments, when the object 210 is static, the AR system 246 displays the real object 210 to the user on the display screen. As the object 210 viewed by the local user begins to move, the AR system 246 replaces the real object 210 with a virtualized object 210 on the display screen. In other embodiments, the AR system 246 replaces the real object with the virtualized object when the user begins to interact with the object, step 254. As the real object moves, the AR system 246 determines the three-dimensional location and appearance of the virtualized object for the local user of the local user device 202. Similarly, the system determines the three-dimensional location of the original, non-virtualized object 210 for the local user 202. The non-virtualized object 210 may quickly fall out of view (e.g. fall to the floor, stick to a wall) or it may temporarily remain active and within the local user 202 view. In the latter case, it must be visually removed from the local user's view if it has changed direction or position according to virtual manipulations. For example, if a ball is thrown, no action is required by the system as long as the ball's trajectory is uninterrupted either by real- or virtual-space—as determined by the resolution module 248. However, once the object's real-space disagrees with its virtual-space component, it must be in-painted. As the object viewed by the local user moves, the AR system 246 in-paints the view seen on the display of the local user device. The display on the screen is updated based on the virtualized object, to reflect the position, orientation and motion of the virtualized object, even though the real object is still present with the local user.

At the same time, the AR system 246 determines the three-dimensional location and appearance of the virtualized object for remote users including the remote user. As the virtualized object is moved, the AR system 246 updates the appearance displayed on the display screen of the remote user device 204. Updating includes showing the change in location, orientation, motion and any other characteristics of the virtualized object. Moreover, if lighting is different in the environment of the remote user device 204, the apparent lighting of the virtualized object is matched to the lighting in the remote environment.

In some embodiments, in order to provide computational efficiency, the AR system 246 may provide to the local user device 202 and the remote user device 204 a relatively low resolution initially. When the AR system 246 determines that the local user interacts with the object 210, if the object 210 has not been fully scanned, the AR system 246 may give a low resolution view of the object 210 while completing the scan of the object 210. The initial low resolution view may show only the shape of the object 210, or an approximation of the shape of the object 210, and its location in the environment or the orientation of the object 210. As the AR system 246 achieves a more full scan of the object 210, additional details may be rendered for the object, such as details of the shape and size and texture of the object. If the local user puts the object 210 down before the AR system 246 has completed scanning the object, the AR system 246 can either continue scanning the object 210 to obtain additional visual details and storing scanned information for later use. In some embodiments, the AR system can suspend further scanning of the object 210 to conserve computational resources. Similarly, if the local user moves or changes position so that the object 210 is no longer in the visual field of the user at the local user device 202, the AR system 246 can continue scanning the object 210 to obtain additional visual information and store the visual information for subsequent user. In other embodiments, the AR system 246 may suspend scanning objects outside the visual field of the user at the local user device 202 to conserve computational resources.

Thus, the AR system 246 may continually update its data for the object 210 based on ongoing opportunities to scan the object 210. The computer vision system implemented by or used by the AR system 246 requires time to scan and process the object 210. If the object 210 is suddenly brought into the environment or into view of the AR system 246, the AR system 246 will initially model the object 210 with the information it has available, such as shape of the object and colors of the object's appearance. If the object is moved to introduce a new angle or a new perspective of the object, the AR system 246 can resume or continue scanning the object to identify additional features of the object and to update and refine the model of the object. For example, if the object 210 is initially held in the hand of the local user, parts of the object may be obscured from scanning by the AR system 246. However, as the local user at the local user device 202 moves the hand or throws the object 210, more perspectives and more details of the object 210 become visible and able to be scanned by the AR system 246. The AR system 246 looks for opportunities to improve the fidelity of the model that the AR system 246 transmits to other users including the remote user. The continued scanning may be done as a background process while other activities are tracked by the AR system 246.

The AR system 246 receives from the local/remote resolution system 248 information about characteristics of the object 210 and a prediction of the interactions by the users, including the local user at local user device 202 and the remote user at the remote user device 204, step 260.

At step 262, the local user releases the object 210. For example, the in a gaming situation, the local user device 202 may be a game piece such as a ball thrown toward the display screen where the local user views the remote user. In a work collaboration situation, the local user may push the object toward the remote user device 204 for inspection or interaction. At step 264, the AR system 246 observes the state of the object 210 and the physics of the object. The state of the object 210 may include, for example, that the object is in motion from the local user toward the remote user, that the object is moving across a table surface on which it rests, etc. The physics of the object 210 may include is velocity, trajectory, forces acting on the object such as gravity and other acceleration, and others.

At step 266, the AR system 246 resolves the location of the object. This may be done, for example, by continuously scanning the environment of the local user device 202 and identifying a three-dimensional location of the object 210, along with a predicted location if the object is moving. The AR system 246 provides location information to the local/remote resolution system 248.

At step 268, the local/remote resolution system 248 determines the location and the appearance of the object 210 for all users including the local user of the local user device 202. Each user has a different perspective or viewpoint of the object 210. For example, if the local user is handing the object 210 to the remote user, the local user sees the object in the local user's hand and receding into the distance toward the hand of the remote user. The remote user sees the object 210 approaching the remote user's hand. If other users are participating, their viewpoints are resolved as well, taking into account viewing angle, lighting and other factors. The local/remote resolution system 248 determines the visual information required by each user and provides this information to the AR system 246.

At step 270, the AR system 246 uses the visual information from the local/remote resolution system 248 to in-paint the local object. As the virtual object displayed to the local user is moved in the display, the local object, physically present with the local user and the local user device 202, is replaced in the display of the local user device 202 with the virtual object according to the AR system 246. The AR system 246 updates the data associated with the local object 210 so that its appearance in the display of the local user device is replaced with its virtual appearance.

Meanwhile, at step 272, the AR system 246 continues scanning the local object and the local environment in order to enhance details. As indicated above, as different views or perspectives of the object 210 become available, the AR system 246 scans the object 210 and modifies and improves its model accordingly. This additional object scanning may occur continuously if network bandwidth and available processing power enable. In some embodiments, additional scanning may occur if the AR system 246 determines that a new view or perspective becomes available because of movement of the object 210 or other change in the environment.

At step 274, the local user device 202 renders the in-painted real object and virtual object 210 using the updated visual information for the object 210 provided by the AR system 246 at step 270. Similarly, at step 276, the AR system 246 renders the virtual object on the display of the remote user device 204. For the local user, where the real object has moved in display of the device of the local user, the AR system 246 updates the displayed image to show the virtual object in a new location and to paint over the former location in the display previously occupied by the object 210. Painting over or in-painting may include modifying the appearance of the displayed image by, for example, copying colors and details from surrounding regions into the region formerly occupied by the image. Painting over or in-painting may include softening details such as image focus or lines or edges between object and structures that appear in the image. The goal of in-painting is to reduce or eliminate any appearance that the real object remains in the previous location. For the remote user, the virtual object on the display of the device of the remote user is updated to show the new location of the object 210. The AR system 246 synchronizes the apparent position, orientation and physics of the object 210 as they appear in the display of the device of the local user device 202 and the display of the remote user device 204.

As the virtual object is displayed to the local user and the remote user, the users may interact with the object. The AR system 246 monitors and tracks the interaction and updates the display seen by the local user and the remote user accordingly. Thus, as the object moves and changes orientation or is deformed or otherwise modified, the changes are tracked and reflected in the display shown to each user.

At step 278, optionally, blocking may be applied so that only one user may interact with the object at a time. According to the blocking option, the AR system 246 determines that a user is physically manipulating the object 210 and, in response, makes manipulation exclusive to that user. No other user is permitted to manipulate the object 210 until the original user releases the object. Any suitable technique may be used to lock out or block another user and to communicate the blocking status to the respective users.

At step 280, the AR system 246 can optionally provide visual guidance or a highlight of the original local object 210, and show any changes that have been made to the object 210. This may be an optional feature available at the request of a user such as the local user of the local user device 202. This may be a useful feature to allow the local user to monitor changes that have been made to the object.

At step 282, the local user interacts with the object 210. Similarly, at step 284, the remote user device 204 interacts with the object 210. Interactions are reported to or collected by the AR system 246. Each user may interact with the virtualized object 210 by modifying its color, shape, appearance, etc. At step 286, the AR system 246 tracks the manipulations of the object and at step 288, the AR system 246 reports the manipulations to the local/remote resolution system 248.

In one exemplary set of interactions, where the object comprises a game piece such as a ball, the local user picks up the ball, tosses the ball to the remote user and the remote user catches the ball. Initially, the AR system 246 provides to the device of the local user an image of the real ball in the local environment. For example, if the ball is sitting on the table, in the display device of the local user, the local user will see the ball as seen by the computer vision system. As the local user's hand interacts with the ball, the AR system 246 detects the interaction and provides to the device of the local user a virtual image of the ball. The virtual image is of the ball from the perspective of the local user, as the user sees the ball on the table. At the same time, the AR system 246 provides to the device of the remote user a virtual image of the ball. The virtual image provided to the remote user is of the ball from the perspective of the remote user.

The AR system 246 may initially provide a low resolution image of a ball as both the local virtual image and the remote virtual image. The low resolution image may be based on a model such as a machine learning model. The low resolution image is an initial approximate version of the ball, based on initial characteristics determined by the AR system 246 about the ball, such as that the ball is round had has a certain size. The AR system 246 continually scans the ball to improve its model or its understanding of the ball. As the model improves, the AR system 246 may improve the local virtual image of the ball and the remote virtual image of the ball, such as by showing additional details that the AR system 246 has discerned, such as texture and color of the ball. The AR system 246 works to continually improve its local virtual image and its remote virtual image as more details of the ball are observed.

As the local user picks up the ball and throws the ball, the AR system 246 detects the motion as well as physical features such as trajectory, velocity and apparent mass of the ball. The AR system 246 maintains the physics of the ball in motion, such as by modelling the effect of gravity on the ball or deformation of the ball. The AR system 246 can predict interaction of the ball with other objects in the local environment or in a virtual environment.

The local user sees the local virtual image of the ball on the local display device and, in this example, the ball appears to travel away from the local user, growing apparently smaller in size. The remote user sees the remote virtual image of the ball on the remote display device. The ball appears to travel toward the remote user, growing apparently larger in size. The remote user can make a catching interaction to catch the ball in whatever manner is appropriate for the device of the remote user. The AR system 246 detects the catching interaction by the remote user and updates the virtual local image of the ball and the virtual remote image of the ball. Other multi-user interactions may be handled in a similar fashion by the AR system 246.

At step 290, the local/remote resolution system can provide a summary and playback of manipulations of the object by the local user and the remote user. The playback may appear as a video replay of the recorded manipulations and movements of the object by one or both users. The playback can be as viewed from the perspective of any user including the local user of the local user device 202 and the remote user of the remote user device 204. The system can record the state of the object and manipulations of the object over time. Once the object 210 has been virtualized, the AR system 246 in conjunction with the local/remote resolution system 248 records how the object 210 was manipulated for proposed changes to the object itself. Once virtualized, the AR system can track the object and its interactions with users and other objects in the environment.

At any point, including after completion of the experience, the AR system 246 can offer summary and playback of object and user interactions. This information can be rendered to other formats, such an instruction video. The AR system 246 may operate with any arbitrary object. The object or objects do not need to be previously scanned. As the local user touches and interacts with the object in the environment, the AR system 246 recognizes the objects and the interactions and stores information about those. In some embodiments, the stored information include timestamp information so that the stored information can be fully accessed for playback and reconstruction subsequently. When the local user does not actively engage the object or objects, the AR system 246 can continue scanning the object or objects to enhance the stored models of the objects. Intermediate states of the object can be retrieved later for review if desired.

In another example, users can collaborate over the object, such as in a brainstorming session to decide how to modify the object for a particular purpose. The proposed modifications may be made virtually by the local user and the remote user interacting with the virtualized object. Subsequently, the playback feature allows review of the modifications.

In another application, the AR system 246 may be combined with a three-dimensional printing system. The AR system 246 allows the local user and the remote user to modify the virtualized object 210. The stored data for the modified object may be converted to input data for a 3D printing system and a physical object may thus be made from the virtualized object.

The AR system 246 provides new opportunities for gaming. In such a system, objects do not require physical complexity to match a game object. For example, a user may use a simple object such as bean bag for a javelin, dodge ball, or substitute one projectile for another projectile. The AR system 246 detects the object and user manipulations of the object, virtualizes the objects and converts the object and its manipulations to game play. This can reduce costs and allow new game controller interactions.

In other examples, the synchronization and recording of object interactions by the AR system 246 allows for easy replay and export to both off-line and simultaneous users in remote locations. In some embodiments, this can be done with lower bandwidth as represented object and precise spatial location information.

In other examples, the AR system 246 understands a scene or environment and identifies and recognizes objects which may be interacted with by users. When an object can be virtualized, the AR system 246 knows what information is truly needed for local/remote synchronization.

The AR system 246 may further be used in education and training opportunities where a single real physical object from one local user can be quickly scanned but then remotely interacted with for object manipulation, such as by changing object form. The scanned object can have the semantics of its component pieces that can be broken into smaller pieces—either with linkage to an existing model or by continually scanning locally removable parts. In another example involving commerce, the style of an object, such as the texture or appearance, can be modified by remote users. This may allow for better immersion and personalization of the object.

While for purposes of simplicity of explanation, the respective processes are shown and described as a series of blocks in FIG. 2X, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram of a virtualized communication network 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and process 244 presented in FIGS. 1, 2A, 2B, 2C, and 3. For example, virtualized communication network 300 can facilitate in whole or in part an augmented reality system operated with a local user at a local site including an object at a local environment and a remote user at a remote site. Each of the local user and the remote user operate user devices that facilitate participation in the augmented reality system over the virtualized communication network 300. The augmented reality system permits both users to interact with the object and permits virtualizing the object for two-way manipulation without using a prior three-dimensional model of the object.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
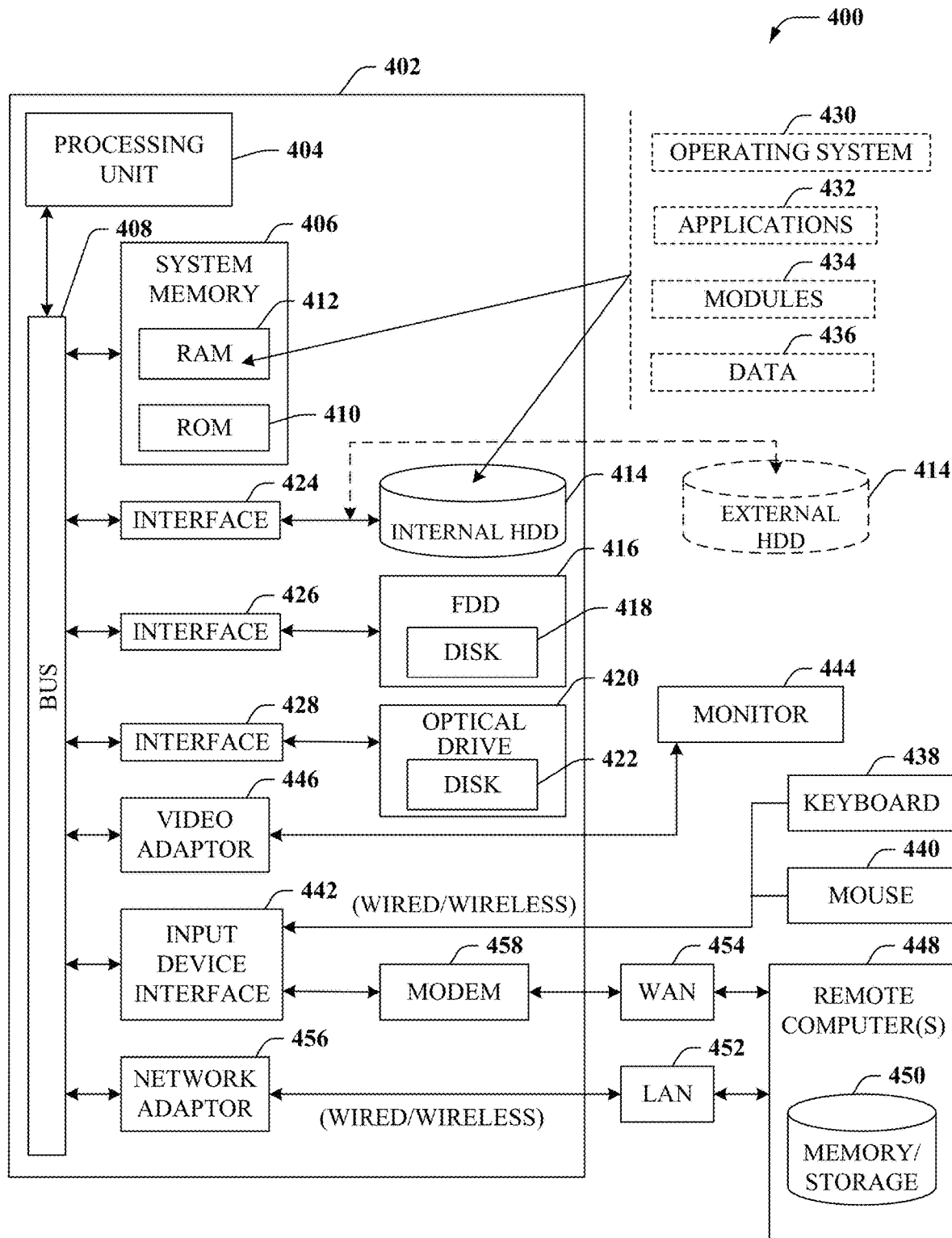
FIG. 4 is a block diagram of an example, non-limiting embodiment of a computing environment in accordance with various aspects described herein.

Turning now to FIG. 4, there is illustrated a block diagram of a computing environment 400 in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part an augmented reality system operated with a local user at a local site including an object at a local environment and a remote user at a remote site. Each of the local user and the remote user operate user devices that facilitate participation in the augmented reality system over a communication network. The augmented reality system permits both users to interact with the object and permits virtualizing the object for two-way manipulation without using a prior three-dimensional model of the object. The local user device operated by the local user participating in the augmented reality system, as well as the remote user device operated by the remote user, may include some or all aspects of the computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
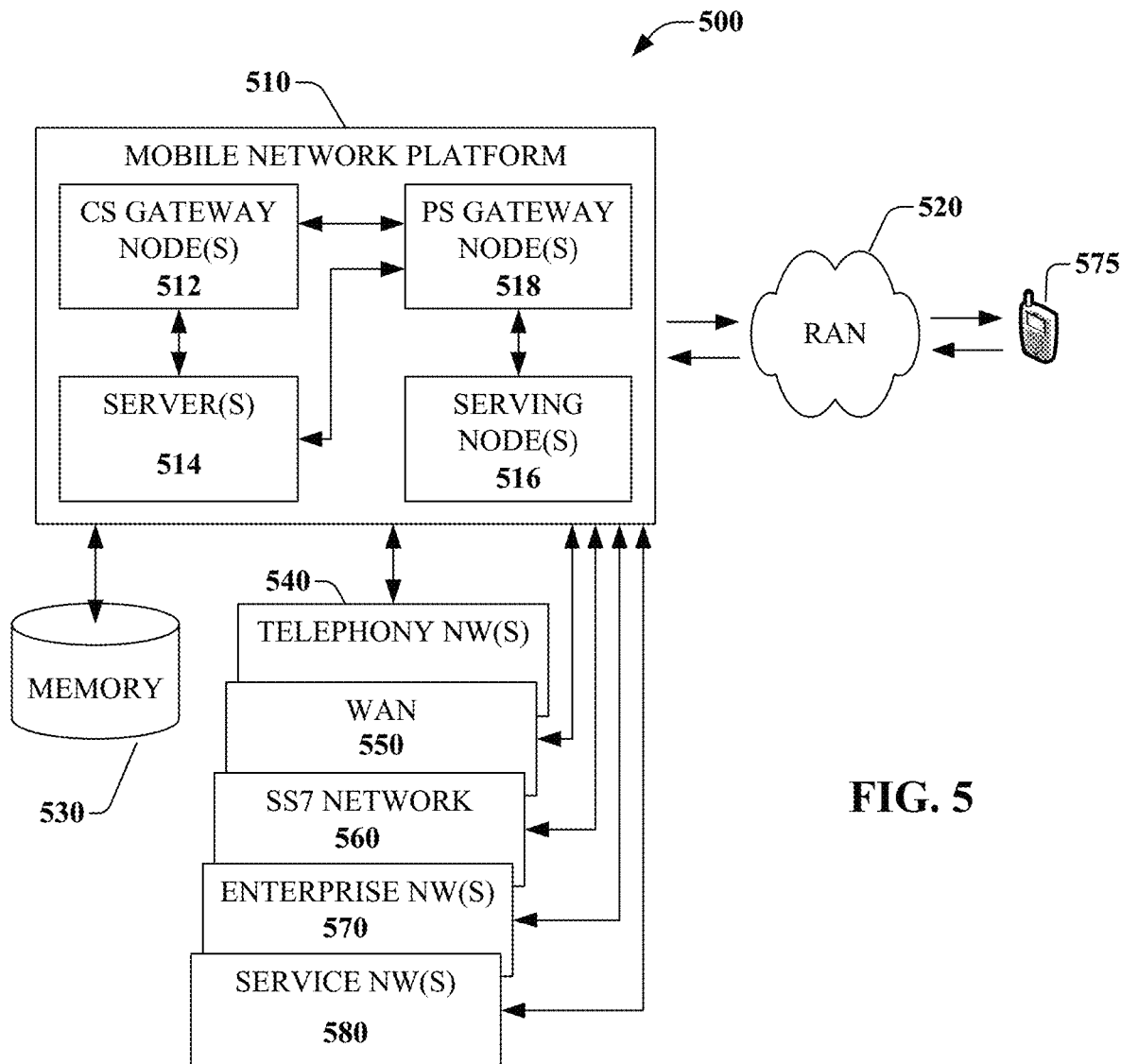
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part an augmented reality system operated with a local user at a local site including an object at a local environment and a remote user at a remote site. Each of the local user and the remote user operate user devices that facilitate participation in the augmented reality system over a communication network. The augmented reality system permits both users to interact with the object and permits virtualizing the object for two-way manipulation without using a prior three-dimensional model of the object. The local user device operated by the local user in the augmented reality system, as well as the remote user device operated by the remote user and the communication network by which they communicate, may incorporate some or all elements of the mobile network platform 510. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through network(s) associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
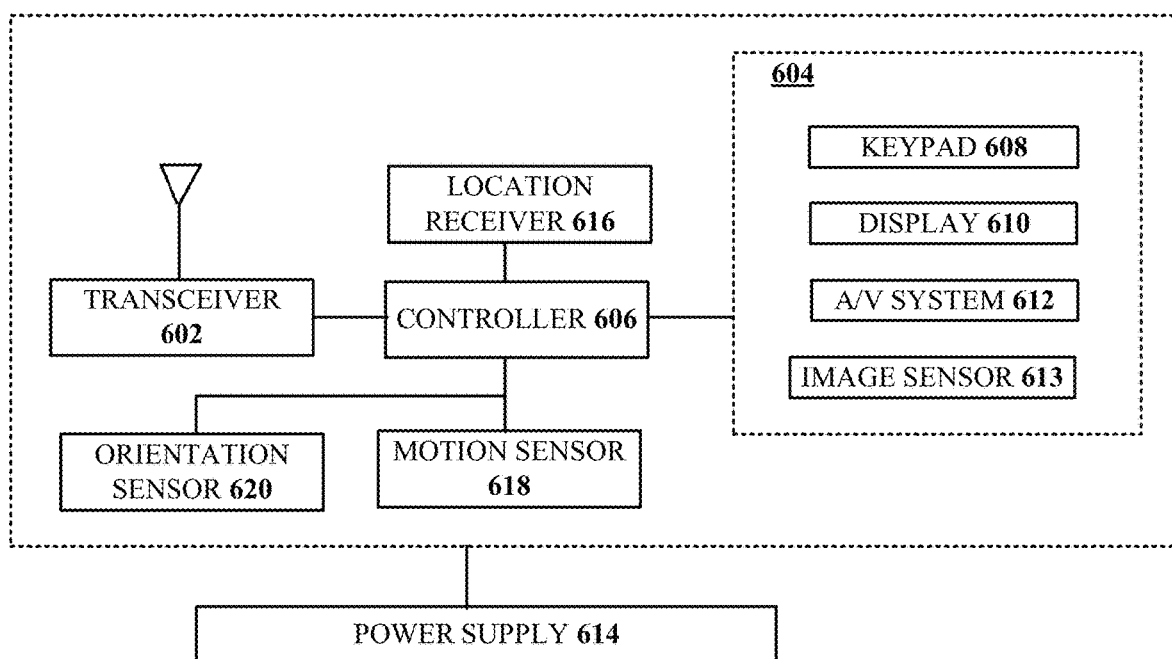
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part a local user device operated by a local user or a remote user device operated by a remote user in an augmented reality (AR) system. The AR system may include the local user at a local site including an object at a local environment and the remote user at a remote site. Each of the local user and the remote user operate user devices, such as the communication device 600 that facilitate participation in the augmented reality system over a communication network. The augmented reality system permits both users to interact with the object and permits virtualizing the object for two-way manipulation without using a prior three-dimensional model of the object.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Instead, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
 a processing system including a processor; and
 a memory that stores executable instructions that, when executed by the processing system, facilitate performance of operations, the operations comprising:

scanning a local environment including an object, wherein the scanning comprises identifying one or more characteristics of the object;

providing, to a display device of a local user in the local environment, local image information of the object, the local image information from a viewing perspective of the local user;

providing, to the display device of a remote user in a remote environment, remote image information of the object, the remote image information from a viewing perspective of the remote user;

detecting a local user interaction with the object by the local user;

detecting a release of control of the object by the local user to control of the object by the remote user; and providing updated local image information of the object to the display device of the local user and providing updated remote image information to the display device of the remote user based on the release of control of the object.

2. The device of claim 1, wherein the operations further comprise:

detecting a remote user interaction with the object;

further updating the local image information of the object and the remote image information based on the remote user interaction; and providing the further updated local image information to the display device of the local user and providing the further updated remote image information to the display device of the remote user.

3. The device of claim 1, wherein the scanning further comprises:

identifying a hand of the local user proximate the object;

identifying a machine learning model for the object based on the one or more characteristics of the object, wherein the machine learning model is accessed from a library of pre-existing models;

scanning the object to identify additional characteristics of the object; and updating the machine learning model based on the additional characteristics.

4. The device of claim 3, wherein the operations further comprise:

based on the machine learning model, providing as the local image information an initial approximate local appearance of the object and providing as the remote image information an initial approximate remote appearance of the object;

during the scanning of the object to identify additional characteristics of the object; updating the machine learning model to form an updated model of the object; and updating the local image information and the remote image information using the updated model of the object.

5. The device of claim 1, wherein the scanning further comprises:

identifying a shape and an orientation of the object, wherein the object is an arbitrary, unknown object;

identifying a machine learning model for the object based on the shape and the orientation of the object;

identifying additional characteristics of the object, wherein the additional characteristics include a texture, a color or a deformability of the object, or a combination of these; and updating the machine learning model for the object based on the additional characteristics.

6. The device of claim 1, wherein the providing updated local image information of the object to the display device of the local user comprises:

providing real object image information of the object to the display device, the real object image information forming an image of the object prior to the local user interaction with the object by the local user; and after the local user interaction with the object by the local user, in-painting the image of the object based on the local user interaction with the object.

7. The device of claim 1, wherein the operations further comprise:

after the detecting the release of control of the object by the local user, maintaining physics of the object while providing the local image information and the remote image information.

8. The device of claim 7, wherein maintaining physics of the object comprises:

detecting a trajectory and a speed of motion of the object after the detecting the release of control of the object; and providing the local image information and the remote image information according to the trajectory and the speed of motion of the object.

9. The device of claim 1, wherein the operations further comprise:

recording the local image information and the remote image information, forming recorded information;

storing the recorded information with associated time stamp information; and subsequently, providing a playback of the recorded information according to the associated time stamp information.

10. A non-volatile computer-readable storage medium, comprising executable instructions that, when executed by a processing system including a processor, facilitate performance of operations, the operations comprising:

scanning a local environment, the scanning including detecting one or more objects in the local environment and detecting a local user in the local environment;

providing, to a local display device of the local user, a local image of the local environment, wherein providing the local image of the local environment comprises providing a three-dimensional image showing the one or more objects in the local environment;

detecting a user interaction with an object of the one or more objects;

identifying a characteristic of the object;

providing, to the local display device of the local user, a local image of the object in the local environment, wherein providing the local image of the object comprises providing an initial approximate image of the object from perspective of the local user based on the characteristic of the object;

providing to a remote display device of a remote user, a remote virtual image of the object, wherein providing the remote virtual image of the object comprises providing a three-dimensional remote virtual image showing the object in the local environment, and wherein providing the remote virtual image of the object comprises providing an initial approximate image of the object viewed from perspective of the remote user based on the characteristic of the object;

further scanning the local environment to identify additional characteristics of the object; and updating the local image of the object at the local display device and the remote virtual image of the object at the remote display device responsive to the additional characteristics.

11. The non-volatile computer-readable storage medium of claim 10, wherein the operations further comprise:
   detecting a local user action with the object by the local user, wherein the local user action comprises a movement of the object from a first location to a second location in the local environment; and
   updating the local image of the object, wherein the updating the local image of the object comprises in-painting the local image at the first location and providing a local virtual image of the object at the second location in the local environment.

12. The non-volatile computer-readable storage medium of claim 11, wherein the operations further comprise:
   updating the remote virtual image of the object at the remote display device responsive to the detecting the local user action, wherein updating the remote virtual image of the object comprises providing the remote virtual image of the object at the second location in the local environment.

13. The non-volatile computer-readable storage medium of claim 12, wherein the operations further comprise:
   detecting a remote user interaction with the object by the remote user at the remote display device; and
   updating the local virtual image of the object and updating the remote virtual image responsive to the remote user interaction.

14. The non-volatile computer-readable storage medium of claim 13, wherein the operations further comprise:
   detecting a release of control of the object by the local user;
   determining a trajectory and a speed of motion of the object responsive to the detecting the release of control of the object; and
   updating the local virtual image of the object and updating the remote virtual image responsive to the trajectory and the speed of motion of the object.

15. The non-volatile computer-readable storage medium of claim 14, wherein the operations further comprise:
   predicting an interaction of the object with another object, wherein the predicting the interaction is responsive to the trajectory and the speed of motion of the object.

16. A method, comprising:
   detecting, by a processing system including a processor, an object in an augmented reality system, the object located in a local environment of a local user of the augmented reality system;
   displaying, by the processing system, the object in the local environment in a local display on a local display device of the local user, wherein the displaying comprises displaying the object from perspective of the local user;
   providing, by the processing system, a remote display of the object on a remote display device of a remote user of the augmented reality system, wherein the displaying the object on the remote display comprises displaying a remote virtual image of the object in the local environment from perspective of the remote user;
   detecting, by the processing system, an interaction by the local user with the object;
   identifying, by the processing system, one or more characteristics of the object, wherein the identifying is responsive to the detecting the interaction by the local user with the object;
   detecting, by the processing system, a movement of the object by the local user from a first location in the local environment to a second location in the local environment;
   updating, by the processing system, the local display of the object on the local display device, wherein the updating the local display comprises in-painting a portion of the local display at the first location and providing a local virtual image of the object at the second location; and
   updating, by the processing system, the remote display of the object on the remote display device, wherein updating the remote display comprises providing the remote virtual image of the object in the second location of the local environment.

17. The method of claim 16, comprising:
   detecting, by the processing system, a remote user interaction with the object by the remote user at the remote display device; and
   updating, by the processing system, the local virtual image of the object and updating the remote virtual image responsive to the remote user interaction.

18. The method of claim 16, comprising:
   identifying, by the processing system, a location of the object in the local environment;
   detecting, by the processing system, a release of the object by the local user;
   determining, by the processing system, a trajectory and a speed of motion of the object responsive to the detecting the release of the object;
   tracking, by the processing system, motion of the object, wherein tracking the object comprises maintaining physics of the object in motion; and
   updating, by the processing system, the local virtual image of the object and updating the remote virtual image responsive to the trajectory and the speed of motion of the object.

19. The method of claim 18, comprising:
   identifying, by the processing system, a catching interaction with the object by the remote user; and
   updating, by the processing system, the local virtual image of the object and the remote virtual image responsive to the catching interaction.

20. The method of claim 16, comprising:
   recording, by the processing system, the local virtual image and the remote virtual image, forming recorded information;
   recording, by the processing system, associated time stamp information; and
   subsequently, providing a playback of the recorded information.

* * * * *